Figure 15:
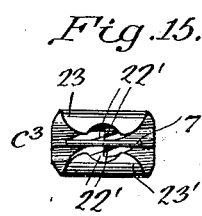

E. J. BROOKS.
SNAP SEAL.
APPLICATION FILED JAN. 22, 1914.
1,092,820.
Patented Apr. 14, 1914.
2 SHEETS—SHEET 1.
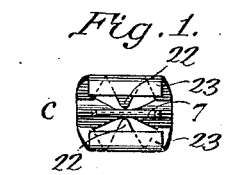
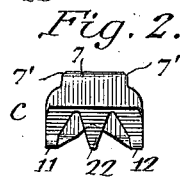
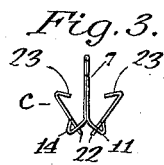
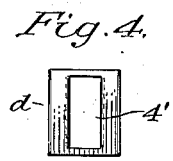
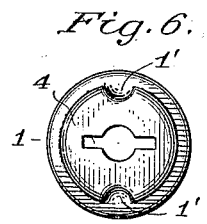
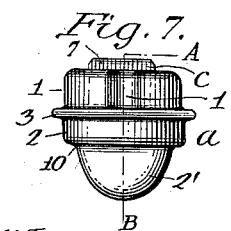
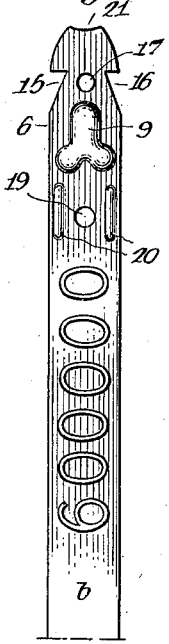
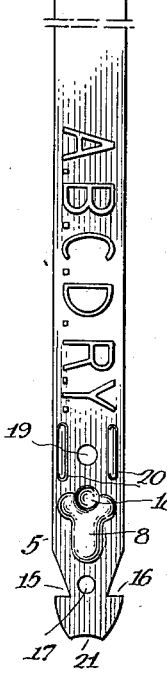
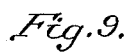
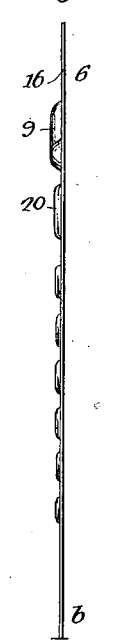
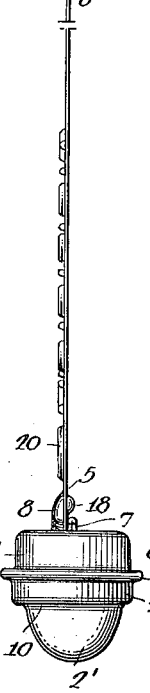
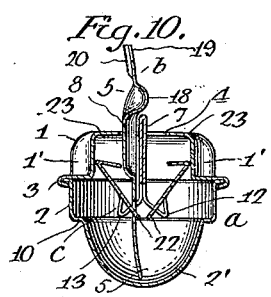
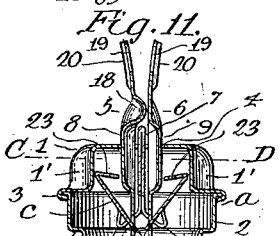
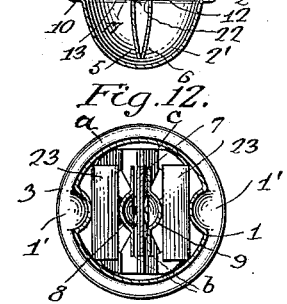
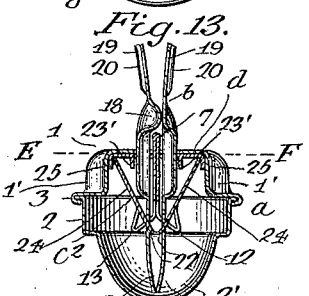
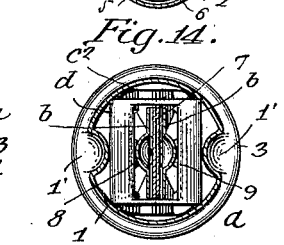

E. J. BROOKS.
SNAP SEAL.
APPLICATION FILED JAN. 22, 1914.

1,092,820.

Patented Apr. 14, 1914.
2 SHEETS—SHEET 2.

Witnesses:

Inventor:
Edward J. Brooks
by his attorney

COLUMBIA PLANOGRAPH CO., WASHINGTON, D. C.

UNITED STATES PATENT OFFICE.

EDWARD J. BROOKS, OF EAST ORANGE, NEW JERSEY.

SNAP-SEAL.

1,092,820.   Specification of Letters Patent.   Patented Apr. 14, 1914.

Application filed January 22, 1914. Serial No. 813,751.

*To all whom it may concern:*

Be it known that I, EDWARD J. BROOKS, a citizen of the United States of America, and a resident of East Orange, in the State of New Jersey, have invented a new and useful Improvement in Snap-Seals, of which the following is a specification.

This invention relates, in common with previous improvements, to self-fastening seals, or "snap seals" as they are commonly termed, for use, as substitutes for lead and wire seals and other press-fastened or press-fastenable sealing devices, to secure the doors of railway freight cars and for other like purposes. Examples of such snap seals are set forth in my previous specifications forming part of United States Letters Patent No. 1,027,812, patented May 28, 1912; No. 1,030,458, patented June 25, 1912; No. 1,035,526, patented August 13, 1912, and No. 1,052,562, patented February 11, 1913.

The present invention relates more particularly to a type of such snap seals distinguished by the combination with a resiliently flexible shackle having a normally flat' withdrawal resisting catch portion at each end of a bulb-shaped seal part having an inlet hole in its top, and a center piece supported within said seal part in juxtaposition to said inlet hole; said center piece being constructed with shackle-end flexing portions, a passageway forming recess common to said flexing portions, and spring catches and catch-engaging portions adapted to interlock with both shackle ends in the snap-fastened seal, and all the members of the seal being adapted to be made of suitable light-weight sheet-metal or its equivalent.

The present invention consists in certain improvements, forming novel combinations of peculiarly constructed parts, and in an improved snap seal embodying said improvements or any of them, as hereinafter particularly described and claimed.

The leading objects of this invention are to prevent the retraction of either spring catch within the seal part of the snap-fastened seal; to prevent displacing the catch-protecting guard or guards; and to duplicate, in a highly effective manner, the fastening of each shackle end, so that normally a pair of spring catches will press against the respective sides of each shackle end, or into a catch hole therein, and one or the other will under all circumstances be effective to prevent withdrawing the shackle end, and thus to prevent successfully tampering with the snap catches should they be reached.

Other objects will be set forth in the general description, which follows:

Two sheets of drawings accompany this specification as part thereof.

Figure 19:
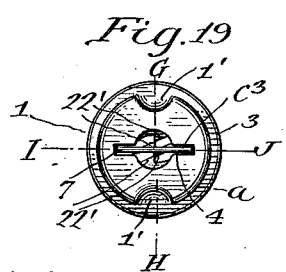
Figure 20:
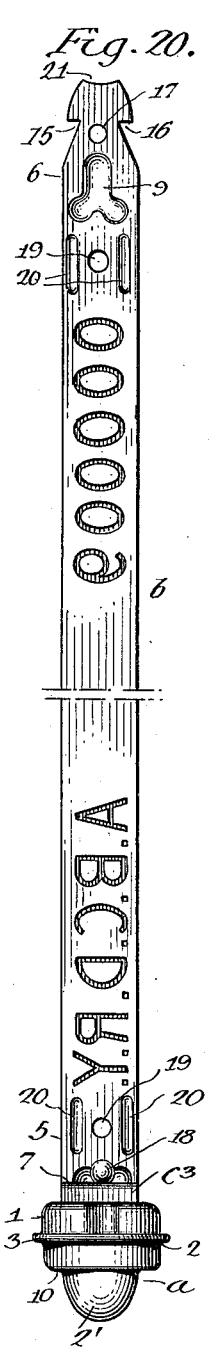
Figure 21:
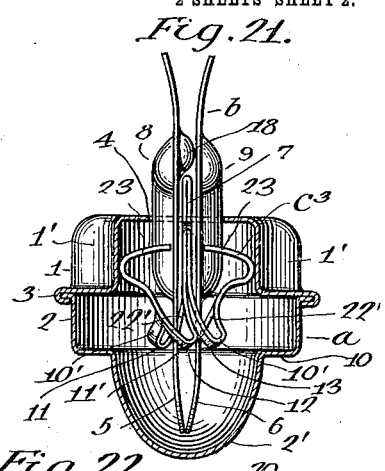
Figure 22:
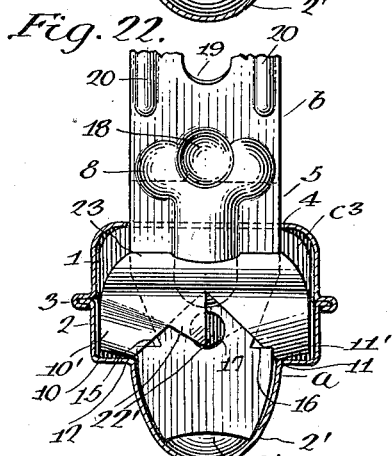
Figure 23:
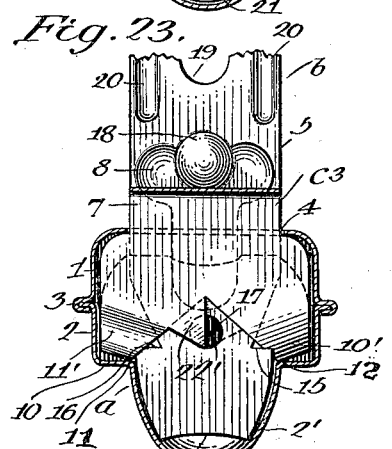

Figures 1, 2 and 3 are respectively top, side and edge views of an improved center piece; Figs. 4 and 5 are respectively top and end views of a guard piece adapted for use in connection with center pieces of other species; Fig. 6 is a top view of an improved bulb piece detached; Fig. 7 is a side view of a seal part including said improved bulb piece and inclosing said improved center piece; Fig. 8 is a face view of a preferred shackle; Fig. 9 is an edge view of said shackle with said seal part attached at one end, representing the improved snap seal as it leaves the factory; Fig. 10 represents a magnified view of the seal as it leaves the factory, in section on the line A—B, Fig. 7; Fig. 11 represents a section on the same line through the snap-fastened seal; Fig. 12 represents a cross section on the line C—D, Fig. 11; Fig. 13 represents a section corresponding with Fig. 11 showing said guard piece, Figs. 4 and 5; and Fig. 14 represents a cross-section on the line E—F, Fig. 13. Figs. 15, 16, 17 and 18 are respectively top, bottom, side and edge views of a preferred center piece; Fig. 19 is a top view of the seal part inclosing said preferred center piece; Fig. 20 is a view of the improved seal, including said preferred center piece, as it leaves the factory, showing a back view of the shackle; Fig. 21 represents a magnified section through the seal part of the fastened seal on the line G—H, Fig. 19, showing edge views of the shackle ends and preferred center piece; Figs. 22 and 23 represent sections on the line I—J, Fig. 19, showing the respective sides of one of the shackle ends in the fastened seal.

Like reference characters refer to like parts in all the figures.

The improved snap-seal is composed of a bulb-shaped seal part $a$ (Figs. 6 and 7) and a resiliently flexible shackle $b$ (Fig. 8); the former containing as its catch member a resilient catch-engaging center-piece $c$ (Figs. 1–3, &c.,) or $c^2$ (Figs. 13, 14) or $c^3$ (Figs.

15–18, &c.,) as hereinbefore characterized, with a superadded guard piece $d$ (Figs. 4, 5, &c.,) in the second species.

The seal part $a$, as heretofore, is composed of "bulb pieces", 1 and 2, permanently united after the insertion of the center piece $c$ or $c^2$ or $c^3$ by a circumferential joint 3, and the upper bulb piece is slotted to form an inlet hole, 4, fitted to the two shackle ends 5 and 6, together with an interposed guide projection 7 on the center-piece, including preferably embossed inlet guards 8 and 9, on the respective shackle ends, each having a semi-cylindrical stem constructed to project into the seal part.

The lower bulb piece 2 of each seal part is constructed with an annular shoulder 10, and the center piece $c$ or $c^2$ or $c^3$ is so proportioned that it is held in place by the interaction of said shoulder 10 with points 11, 12, 13, 14, of the center piece, as heretofore; said shoulder being preferably located at a distance below said circumferential joint 3 as shown in Fig. 7, &c., and the bottom 2' of the bulb part shortened and contracted, so as to contact with the fastened shackle ends, and render the same sprung in the snap-fastened seal.

The improved slotted member 1 of the bulb-shaped seal part $a$, shown detached by Fig. 6, is further provided with a pair of diametrically opposite indentations 1', forming parallel cylindrical projections within the seal part, and these projections contact with the wings of the center piece $c$ or $c^2$ or $c^3$ with which its spring catches 22 or 22' are integral, so as to prevent spreading these wings apart in attempts to unfasten the seal by tampering therewith. Compare Figs. 11 and 12 and Fig. 21. The shackle $b$, in all the species, is further provided with a pair of catch shoulders, 15, 16, and an adjacent catch member, 17, at each end, adapted to interlock with the center piece $c$ or $c^2$ or $c^3$; the catch members 17 being in the form of smooth-cut round holes. Between the inlet guards 8 and 9 the shackle is or may be provided with the customary distinguishing marks in the form of lettering, serial numbers or the like, either embossed or printed, as represented by "A. B. C. D. Ry" and "600000" in Fig. 8. The shackle $b$, especially the shackle end 5, is preferably further provided, as shown, with an embossed projection or rounded protuberance, 18, so located as to project immediately above the guide portion 7, and both ends of the shackle are preferably further provided with inspection facilitating apertures, 19, flanked by strain-resisting ribs, 20. Also with concaved extremities, 21, Fig. 8, to contact effectively with the spring catches 22, or 22', of the center piece $c$ or $c^2$ or $c^3$.

In the first species, represented by Figs. 1–3 and Figs. 7–12, the seal part $a$ and shackle $b$ above described are combined with an improved center piece $c$. In this improved center piece $c$, shown detached by Figs. 1–3, the protruding guide projection 7 is provided with beveled ends as shown at 7', to facilitate inserting the center piece; and its improved construction is further and more particularly distinguished by wings having inturned upper edges forming guard flanges, 23, which project over the spring catches 22 and protect these catches against being pressed back by a thin piece of metal or the like inserted through the inlet hole 4 in attempts to unfasten the snap-fastened seal, Figs. 11 and 12, by tampering therewith.

Figure 16:
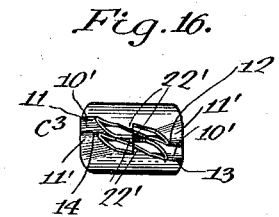
Figure 17:
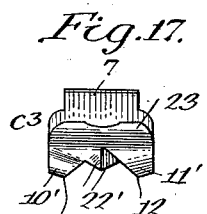
Figure 18:
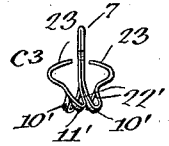

In the species represented by Figs. 4, 5, 13 and 14, the bulb-shaped seal part $a$ is preferably, as shown, of the improved construction above described, but, in common with the shackle $b$ and center piece $c^2$, may be of known construction, with or without squaring the upper edges of the wings 24 of the center piece, upon which wings a rigid guard piece, $d$, of sheet metal or the like, is supported as alternative means for protecting the snap catches 22 in substantially the same manner as by said guard flanges 23 of the first species. Compare Figs. 13 and 14 with Figs. 11 and 12. A suitable form of said guard piece $d$ is shown detached by Figs. 4 and 5, which see. This guard piece has a flat top, and is slotted as shown at 4' so as to clear the central enlargement of the inlet slot 4 of the seal part $a$, and is constructed with downwardly projecting flanges 23' corresponding in function with said guard flanges 23, with or without flanges, 25, to embrace the upper edges of said wings 24. In the third species, represented by Figs. 15–23, said improved bulb-shaped seal part $a$ and flexible shackle $b$ are combined with an improved center piece, $c^3$, of preferred construction; and those claims hereto appended which are not generic are based on this third species. In said improved center piece $c^3$, instead of a single downwardly projecting pointed spring catch 22 to interlock with each of the shackle ends 5 and 6 as in the other species, I have succeeded in locating a pair of effective catches 22' for each shackle end, so that normally, in the fastened seal Figs. 21–23, a spring catch 22' presses against each side of each shackle end or into its catch hole 17. Compare Figs. 22 and 23, which show one and the same shackle end, 5. Owing to this construction, should the shackle end be disengaged from one of its pair of catches, it is more securely held by the other catch of the pair, and it is practically impossible to release it. The pair of catches preferably project obliquely downward and inward from at or near the respective lateral edges of the center piece, as shown in Figs. 17, 22 and 23. As thus arranged each pair of catches 22' effectively resists not only direct pulls on the fastened shackle end, but also edgewise movements thereof in attempts to release the shackle end by tampering with the seal. To provide at the same time for the interlocking of the catch shoulders 15, 16 of each shackle end with the center piece $c^3$, the lower corners 10' and 11' of that portion of the center piece appropriated to each shackle end are bent in opposite directions, as best shown in Fig. 16, to form its deflecting portions substantially in the manner set forth in my said Patent No. 1,027,812, but by less sharp or pronounced bends than there shown. The catch portions of each shackle end are temporarily bent in opposite directions in passing through the center piece, and resume their normally flat form beneath the same. In this plane, in the fastened seal, the catch shoulders 15, 16, in their flat form, project below and across portions deflected with said lower corners 10' 11' and assist in securing the shackle end against withdrawal. Said preferred center piece $c^3$ is conveniently further provided with inwardly projecting guard flanges 23 integral with the wings of the center piece, substantially as in said first species, as means within the seal part for protecting the catches 22' against access through the inlet hole 4. Said flanges 23 are notched as shown in Fig. 15 to more amply obstruct the spaces immediately beneath the inlet hole 4 in the fastened seal by embracing the respective inlet guards 8 and 9. The guard flanges 23 or 23' of the several species are supported by the center piece $c$ or $c^2$ or $c^3$ at the respective sides of the central guide 7, so as to protect the subjacent spring catches 22 or 22'. Compare Figs. 15 and 21 with Figs. 11, 12 and Figs. 13, 14. Other means may obviously be employed to hold said guard piece $d$ in effective position; and catch members of the shackle ends and center piece in the first and second species may be of other known or improved forms; some of the features above described as "preferred" may be wholly omitted; and other like modifications will suggest themselves to those skilled in the art.

Having thus described said improvement, I claim as my invention and desire to patent under this specification:

1. An improved snap seal having, in combination, a bulb-shaped seal part constructed with an inlet hole in its top, a flexible shackle having a withdrawal-resisting catch portion at each end; a center piece having a central guide for the shackle ends which protrudes through said inlet hole, and withdrawal-resisting means within said seal part in juxtaposition to said inlet hole, including spring catches at the respective sides of said guide, adapted to interlock with said shackle ends respectively; and means within said seal part, including guard flanges above said catches supported by said center piece, and constructed and arranged to protect said catches in the fastened seal against being tampered with.

2. The combination, in a snap seal, of a bulb-shaped seal part having an inlet hole in its top, a flexible shackle having a withdrawal resisting catch portion at each end, and a winged center piece within said seal part in juxtaposition to said inlet hole adapted to interlock with said shackle ends; said seal part having an upper bulb piece provided with lateral indentations forming parallel projections within the seal part which contact with the wings of said center piece and prevent spreading them apart in attempts to release said shackle ends or either of them.

3. The combination, in a snap seal, of a bulb-shaped seal part having an inlet hole in its top, a flexible shackle having a withdrawal resisting catch portion at each end, and a winged center piece within said seal part in juxtaposition to said inlet hole adapted to interlock with said shackle ends; said seal part having an upper bulb piece provided with lateral indentations forming parallel projections within the seal part which contact with the wings of said center piece and prevent spreading them apart in attempts to release said shackle ends or either of them, a lower bulb piece having an annular shoulder upon which said center piece is supported, and a circumferential joint permanently uniting said bulb pieces after the insertion of said center piece.

4. The combination, in a snap seal, of a bulb-shaped seal part having an inlet hole in its top, a flexible shackle having a withdrawal resisting catch portion at each end, and a winged center piece within said seal part in juxtaposition to said inlet hole; said center piece having spring catches adapted to interlock with said shackle ends, and inwardly projecting guard flanges above said catches.

5. The combination, in a snap seal, of a bulb-shaped seal part having an inlet hole in its top, a flexible shackle having a withdrawal resisting catch portion at each end, and a winged center piece within said seal part in juxtaposition to said inlet hole adapted to interlock with said shackle ends in the snap-fastened seal; said seal part having an upper bulb piece provided with lateral indentations forming parallel projections within the seal part adapted to contact with the wings of said center piece and prevent spreading them apart, and said wings being provided with inwardly projecting guard flanges and subjacent spring catches protected by said flanges.

6. The combination, in a snap seal, of a bulb-shaped seal part having an inlet hole in its top, a flexible shackle having a catch hole in each end, and a center piece within said seal part, in juxtaposition to said inlet hole, having a pair of spring catches adapted to press against the respective sides of each shackle end in the fastened seal and to interlock with the catch hole of each shackle end.

7. The combination, in a snap seal, of a bulb-shaped seal part having an inlet hole in its top, a flexible shackle having a catch hole in each end, and a center piece within said seal part, in juxtaposition to said inlet hole, having a pair of spring catches adapted to press against the respective sides of each shackle end in the fastened seal and to interlock with the catch hole of each shackle end, said catches projecting inward from near the lateral edges of the center piece.

8. The combination, in a snap seal, of a bulb-shaped seal part having an inlet hole in its top, a flexible shackle having a catch hole in each end, and a center piece within said seal part, in juxtaposition to said inlet hole, having a pair of spring catches adapted to press against the respective sides of each shackle end in the fastened seal and to interlock with the catch hole of each shackle end, said catches projecting obliquely downward and inward from near the lateral edges of the center piece.

9. The combination, in a snap seal, of a bulb-shaped seal part having an inlet hole in its top and lateral indentations forming parallel projections within the seal part, a resiliently flexible shackle having a normally flat catch portion at each end provided with a catch hole and a pair of catch shoulders, and a center piece within said seal part in juxtaposition to said inlet hole having catch-supporting wings which contact with said projections respectively and are provided with guard flanges above their catches, and shackle deflecting portions the lower corners of which are bent to interlock with said catch shoulders of the respective shackle ends.

10. The combination, in a snap seal, of a bulb-shaped seal part having an inlet hole in its top and lateral indentations forming parallel projections within the seal part, a resiliently flexible shackle having a normally flat catch portion at each end provided with a catch hole and a pair of catch shoulders, and a center piece within said seal part in juxtaposition to said inlet hole having a pair of spring catches adapted to press against the respective sides of each shackle end in the fastened seal and to interlock with the catch hole of each shackle end, catch supporting wings which contact with said projections respectively and are provided with guard flanges above their catches, and shackle deflecting portions the lower corners of which are bent to interlock with said catch shoulders of the respective shackle ends, substantially as hereinbefore specified.

EDWARD J. BROOKS.

Witnesses:
 JOHN J. MOORE,
 JAS. L. EWIN.

---

Copies of this patent may be obtained for five cents each, by addressing the "Commissioner of Patents, Washington, D. C."